INVENTORS
Philip H. Allen
Benjamin J. Cheney

June 5, 1962

P. H. ALLEN ET AL 3,038,158

REGISTERS

Original Filed Jan. 6, 1954

INVENTORS
Philip H. Allen
Benjamin J. Chromy

June 5, 1962  P. H. ALLEN ET AL  3,038,158
REGISTERS

Original Filed Jan. 6, 1954  8 Sheets-Sheet 4

INVENTORS
Philip H. Allen
Benjamin J. Chromy

June 5, 1962    P. H. ALLEN ET AL    3,038,158
REGISTERS

Original Filed Jan. 6, 1954    8 Sheets-Sheet 5

Fig 5

INVENTORS
Philip H. Allen
Benjamin J. Chromy

June 5, 1962 P. H. ALLEN ET AL 3,038,158
REGISTERS
Original Filed Jan. 6, 1954 8 Sheets-Sheet 6

INVENTORS
Philip W. Allen
Benjamin J. Chromy

June 5, 1962 P. H. ALLEN ET AL 3,038,158
REGISTERS
Original Filed Jan. 6, 1954 8 Sheets-Sheet 7

INVENTORS
Philip H. Allen
Benjamin J. Chromy

Fig.11

United States Patent Office 3,038,158
Patented June 5, 1962

3,038,158
REGISTERS
Philip H. Allen, 15335 Via Colina, and Benjamin J. Chromy, 14590 Horseshoe Drive, both of Saratoga, Calif.
Continuation of application Ser. No. 402,434, Jan. 6, 1954. This application Jan. 29, 1960, Ser. No. 5,535
41 Claims. (Cl. 346—33)

This invention relates to registers of the electronic type and is concerned more particularly with the provision of a new electronic recording register employing an electronic control for the recording mechanism.

This application is a continuation of our application S.N. 402,434, filed January 6, 1954, now abandoned, which is a continuation in part of our application Serial No. 644,159, filed January 29, 1946, now abandoned.

It is a general object of the invention to provide an improved recording register.

Another object of the invention is to provide a recording register utilizing electro-sensitive paper and electronic control means for controlling recording of the desired indicia on the paper.

A further object of the invention is to provide a recording register in which the electronic recording means is responsive selectively to either the selecting mechanism or to the registering mechanism.

Another object of the invention is to provide improved electrical recording mechanism.

Other objects of the invention will be apparent from the following description of a preferred embodiment thereof, as illustrated in the accompanying drawings in which.

This invention contemplates generally the provision of a new type of electrical or electronic recording of the digits employed in registering operations both in item entering and in total taking operations, in which the selecting mechanism of the register and the accumulating or registering mechanism thereof are both preferably of the electronic type and are adapted to provide electrical signals of the values standing therein. Also there are provided electronic recording control means and electrical recording means under control thereof to operate in response to value signals. The recording means can be selectively associated with either the selecting mechanism or the registering mechanism to make a record of the values standing therein at any desired time. Preferably the various electronic devices employed in carrying out the invention are of the cathode ray type while the recording means is of the type employing an electro-sensitive record, such as paper or similar recording material which is of a character to discolor when an electric current passes there-through so that by passing an electric current through the record, a desired figure, letter or other indicia is recorded.

In general, the selecting and registering mechanisms disclosed here are of the type disclosed in our co-pending application Serial No. 611,608, filed August 20, 1945, for Registers. Reference may be had to the foregoing application for a complete disclosure of specific apparatus not described herein.

Figure 1:
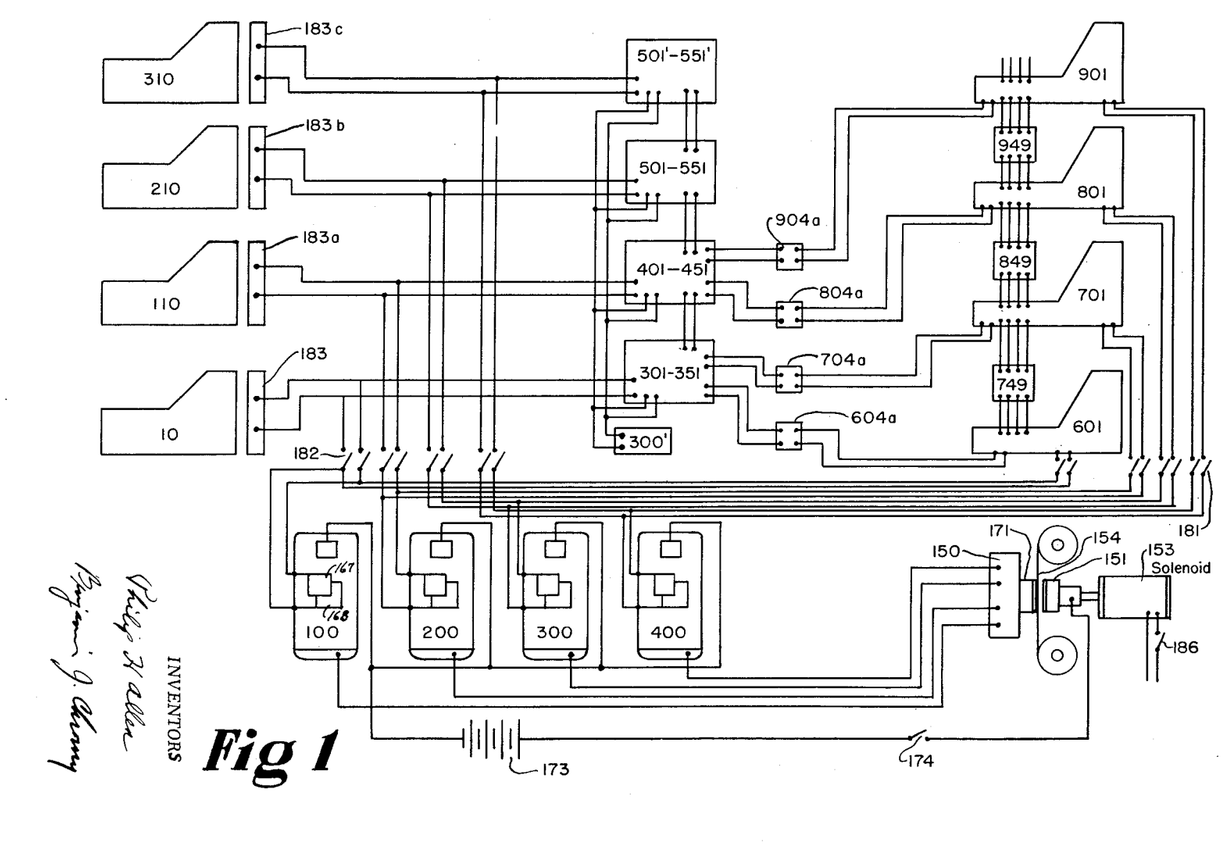
FIGURE 1 is a schematic view and wiring diagram of the recording register.

Referring first to FIGURE 1 there is schematically illustrated four orders of the selecting mechanism including the cathode ray tubes 10, 110, 210 and 310 representing the first four orders or four lowest orders of the selecting mechanism. There are also shown six registering tubes 601, 701, etc., through 901 representing four orders of the registering mechanism.

Selectively associated with the selecting tubes and the registering tubes are a series of recording tubes 100, 200, 300 and 400 of a character later described which are adapted for association with either the selecting tubes or the registering tubes as explained above and in turn control respective orders of a recording electrode assembly 150 having opposed thereto a movable electrode 151 which is pivotally mounted in an insulated fashion at 152 and can be moved forward against the electrode assembly 150 by a solenoid 153. Electro-sensitive paper 154 passes between the electrodes 150 and 151 to perform the recording operations. This paper may be of the general character disclosed in the patents to Kline, 2,251,742, dated August 5, 1941, and 2,294,150, dated August 25, 1942; or Gibney, 2,367,113, dated January 9, 1945.

Figure 1A:
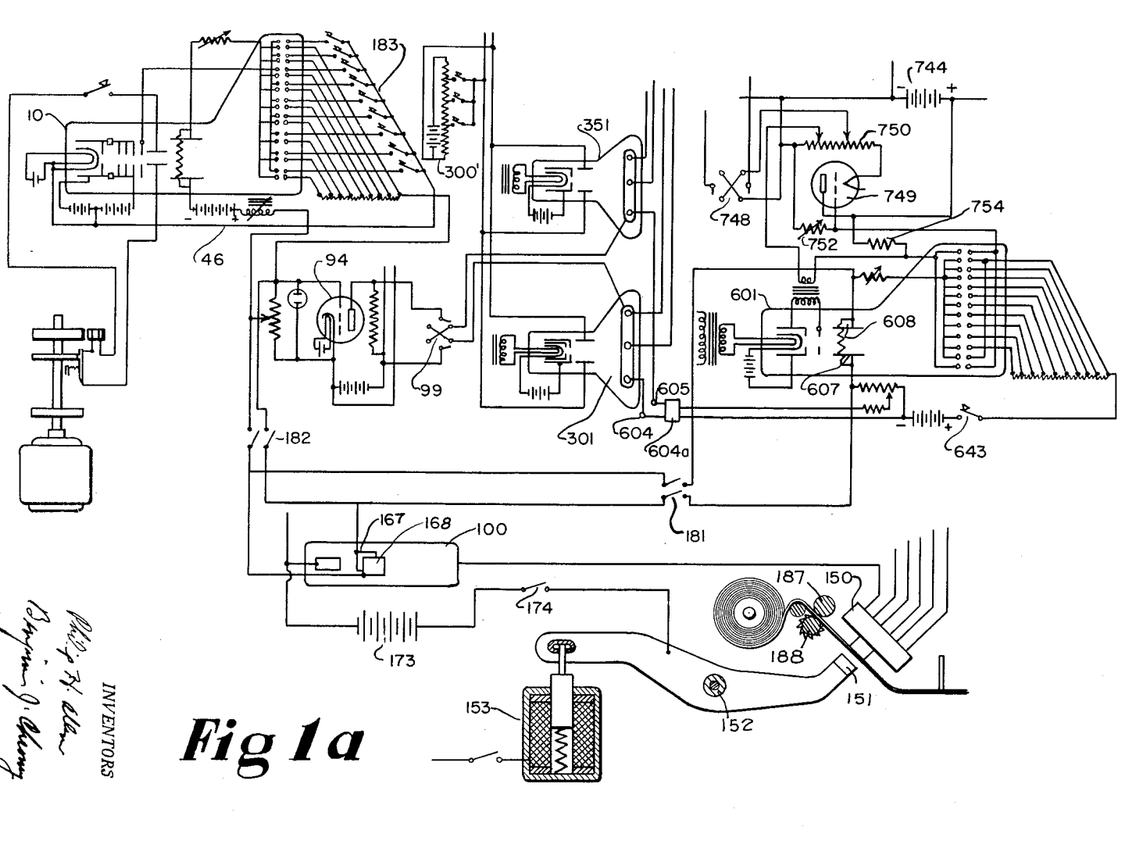
FIGURE 1a is a detail wiring diagram of one order of this apparatus.

Associated with each of the selecting tubes 10, 110, 210 and 310 is a keyboard control 183, 183a, 183b and 183c, respectively, each of which is the same as the keyboard control 183 illustrated in detail in FIGURE 1a. Connections are provided between the keyboards 183, 183a, 183b and 183c and the selection tubes 10, 110, 210 and 310, respectively, associated therewith and the coupling and switching devices 301—351, 401—451, 501—551 and 501'—551', respectively. Connections are also provided between the keyboards 183, 183a, 183b and 183c and the gang switches 182 and through these gang switches to the deflector plates of the cathode ray tubes 100, 200, 300 and 400 respectively so that the potentials on the deflector plates of the selection tubes 10, 110, 210 and 310 representing values set into these respective selection tubes may be applied to the deflector plates of the tubes 100, 200, 300 and 400 respectively when the gang switches 182 are closed.

The coupling and switching devices 301—351, 401—451, 501—551 and 501'—551' each include a coupling tube 94 and a pair of switching tubes 301 and 351 and associated elements as shown in FIGURE 1a connected to the keyboard device 300' and voltage supply connected thereto.

The outputs of the coupling and switching devices 301—351 and 401—451 are connected through electrical networks 604a—704a and 804a—904a to the register tubes 601, 701, 801 and 901. The detail connections for one of these circuits is also shown in FIGURE 1a. Additional register tubes (not shown) are connected to the coupling and switching devices 501—551 and 501'—551'.

A tens transfer circuit including the tube 749 and resistors 750, 752 and 754 is connected between the register tubes 601 and 701. Similar tens transfer circuits 849 and 949 are connected between the pairs of tubes 701—801 and 801—901.

The deflector plates of the tubes 100, 200, 300 and 400 may be connected to the deflector plates of the register tubes 601, 701, 801 and 901 respectively through the gang switches 181 so that potentials corresponding to the values standing in these register tubes may be applied to the deflector plates of these recorder tubes 100, 200, 300 and 400 respectively to control the energization of the selected electrodes of the printer.

Selection Apparatus

Figure 2:
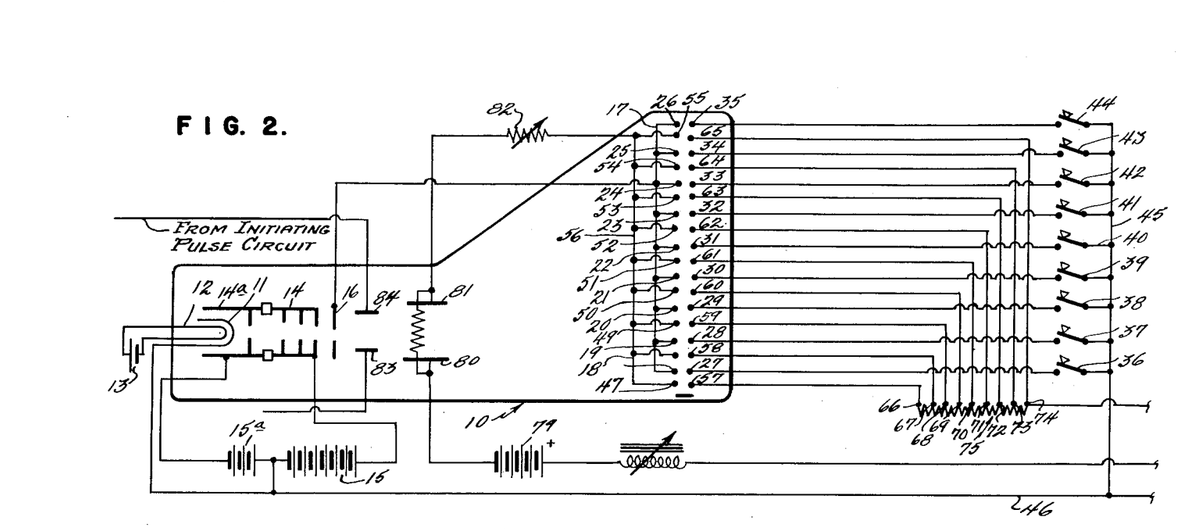
FIGURE 2 is a schematic view of an ordinal portion of value selecting mechanism of the cathode ray type.

Referring to FIGURE 2, reference numeral 10 designates an electronic tube of the cathode ray beam type which is employed in conjunction with other related parts as one order of the selection apparatus. The tube 10 is provided with an electron gun employing a cathode 11 which may be of the indirectly heated type, and a filament 12 connected to a battery 13 or other current supply, a control electrode 14a connected to the negative terminal of battery 15a and an anode 14 connected to the positive terminal of the battery 15, the negative terminal of this battery being connected to the cathode 11 and to the positive terminal of battery 15a.

A quenching or de-focusing electrode 16, connected to the contact electrode bus 17, is provided for the purpose of quenching or de-focusing the cathode ray beam transmitted from the electron gun including the cathode 11, control electrode 14a and anode 14. The contact electrode bus 17 is connected to a plurality of contacts 18 to 26, inclusive, which are provided with electron emitting surfaces from which the electron emission is stimulated by bombardment of the cathode ray beam. Associated with these contacts but slightly spaced therefrom are contacts 27 to 35, inclusive, respectively, and these latter contacts are connected to the manually operated value keys 36 to 44, inclusive, respectively. The value keys are shown schematically in FIGURE 2. One terminal of each of these value keys 36 to 44, inclusive, is connected to the bus 45, as shown, and this bus is in turn connected through the wire 46 to the negative terminal of the battery 15. The cathode ray tube 10 is provided with an additional series of contacts 47 to 55, inclusive, connected to the electrode bus 56. These contacts 47 to 55, inclusive, are associated with the contacts 57 to 65, inclusive, respectively.

Thus the series of contacts 18 to 26, inclusive, arranged in equally spaced relation opposite the corresponding spaced contacts 27 to 35, inclusive, form nine pairs of selective beam quenching contacts that are employed in controlling the production of selected number of impulses from the tube 10. Likewise, contacts 47 to 55, inclusive, and 57 to 65, inclusive, also form nine pairs of equally spaced beam controlling contacts that are employed in producing and transmitting the selected number of impulses by effecting automatic stepping of the beam of the tube 10. All of these contacts that are of negative polarity by virtue of batteries 15 and 79, respectively, when the circuits thereof are closed, are provided with electron emitting surfaces giving profuse electron emission under the bombarding stimulus of the cathode ray beam originating at the cathode 11.

The beam controlling contacts 57 to 65, inclusive, (FIGURE 2) are respectively connected to the terminals 66 to 74 of the voltage dividing resistor 75. The terminal 74 of this resistor is also connected as described in said application to the positive terminal of the cathode ray beam deflecting battery 79. The negative terminal of this battery is connected to the deflector plate 80 of the cathode ray tube 10 and the deflector plate 81, associated with the plate 80, is connected through a variable resistor 82 to the contact electrode bus 56.

An additional set of deflector electrodes 83 and 84 is provided in the cathode ray tube 10 for the purpose of applying the initiating or firing pulse to the electron beam of the cathode ray tube and moving this beam from its initial position, as more fully described in said application to cause production of from "1" to "9" electrical pulses from the tube 10 for transmission to an associated registering tube.

Accumulator or Register Circuit

The accumulator or register comprising the cathode ray tubes 601, 701, 801 and 901 is adapted to receive the selected number of impulses from the related orders of the selection mechanism and accumulate the values therein in response to the number of pulses entered so as to be employed to obtain sums in addition or subtraction to display the product of a multiplation or the sums of products of successive multiplications and to serve in all particulars similar to the accumulator or total register of a calculating or adding machine of the mechanical type. The register tubes are reversible in character and are responsive to both positive and negative pulses to perform addition and subtraction, respectively, as determined by the setting of controls of the apparatus. Also, tens transfer mechanism is provided to transfer increments or pulses from order to order, i.e., from tube to tube, of the register as the transfers occur during the calculating operation. The cathode ray tube 601 (FIGURE 3) is in general, of the same type as cathode ray tube 10 in that this tube is provided with an electron gun 606 for producing an electron beam and transmitting this beam substantially down the length of the tube. The beam passes between the deflector electrodes of the tube to complete the desired circuit at the righthand end of the tube and also activate the fluorescent figures or legends associated with the contactors at the right-hand end of the tube. Thus, the electron beam transmitted by the electron gun 606 of the tube 601 passes between the deflector plates 607 and 608, and after passing between the deflectors 607 and 608 the beam is employed to close the desired circuit associated with the contactors 609 to 618 and 619 to 628. These contactors are arranged in pairs as follows: 609—619, 610—620, 611—621, 612—622, 613—623, 614—624, 615—625, 616—626, 617—627, and 618—628, corresponding to digits from "zero" to "nine," respectively, and these digits are outlined in fluorescent material on the inside surface 629 of the right-hand end of the tube 601.

Figure 3:
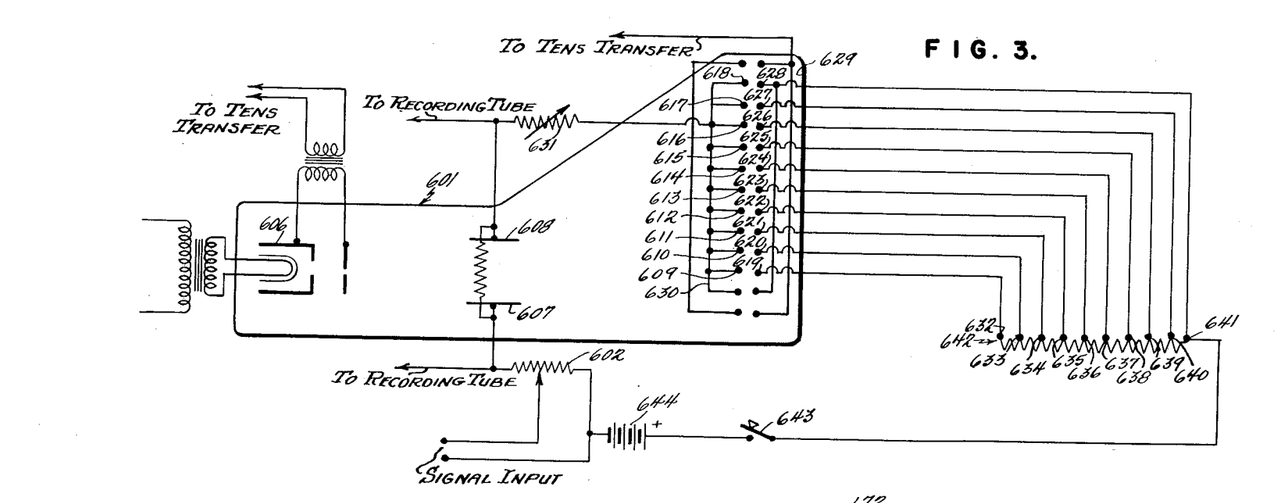
FIGURE 3 is a view of an ordinal portion of the registering mechanism of the cathode ray type.

The contactors 609 to 618, inclusive, are connected together to a bus 630 which is connected to the variable resistor 631 and to the deflector plate 608. The electrodes 619 to 628, inclusive, are connected to taps 632 to 641, inclusive, respectively, of the voltage divider 642. The tap or terminal 641 of the voltage divider 642 is connected to the normally closed zeroizing or resetting key 643 and from this to the positive terminal of the battery 644, the negative of this battery being connected to the resistor 602 and through this to the deflector plate 607.

The above described register tube operates as described in said application in response to electrical signals or pulses to register a value corresponding to the number of pulses received thereby. The potential applied to the electrodes 607 and 608 is a measure of the value registered.

Recording Means

As previously explained the recording means is in the form of a recording electrode mechanism for operation in conjunction with an electro-sensitive paper and a recording control apparatus therefor comprising the ordinal cathode ray tubes 100 through 400 respectively. As these recording tubes are similar only one will be described in detail.

Figure 4:
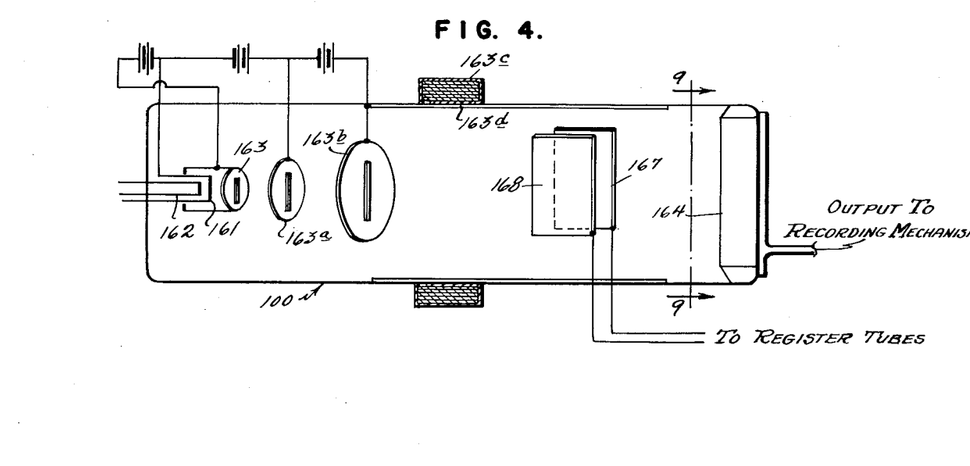
FIGURE 4 is a schematic view of a cathode ray recording control means employed in the instant invention.

Referring to FIGURE 4 the cathode ray tube 100 is provided with a conventional form of electron gun including a cathode 161 having a heating filament 162 associated therewith, a control electrode 163, anodes 163a and 163b and a liner 163d of conventional type to produce a fan shaped electron beam adapted to be scanned over selected rows of contacts supported by the target 164. The electron gun of the type shown in FIGURE 4, in each of the recording tubes 100, 200, 300 and 400 is capable of focusing the electron beam into a thin sheet-like cross-section whose thickness is sufficient to impinge upon a row of contacts 172 and whose width is equal to the vertical length of the target. This tube shown in FIGURE 4 is provided with a control electrode 163 having a narrow slot or slit-like aperture in substantial alignment with larger slots in the first and second anodes 163a and 163b which function to focus the flat beam upon the target 164. Magnetic focusing consisting of a coil 163c surrounding the tube may be used in place of one of the anodes or in addition thereto if desired. The beam passes between the horizontal deflector plates 167—168 and is deflected across the target 164 impinging at the same time upon all of the target contacts of a selected vertical row.

Figure 6:
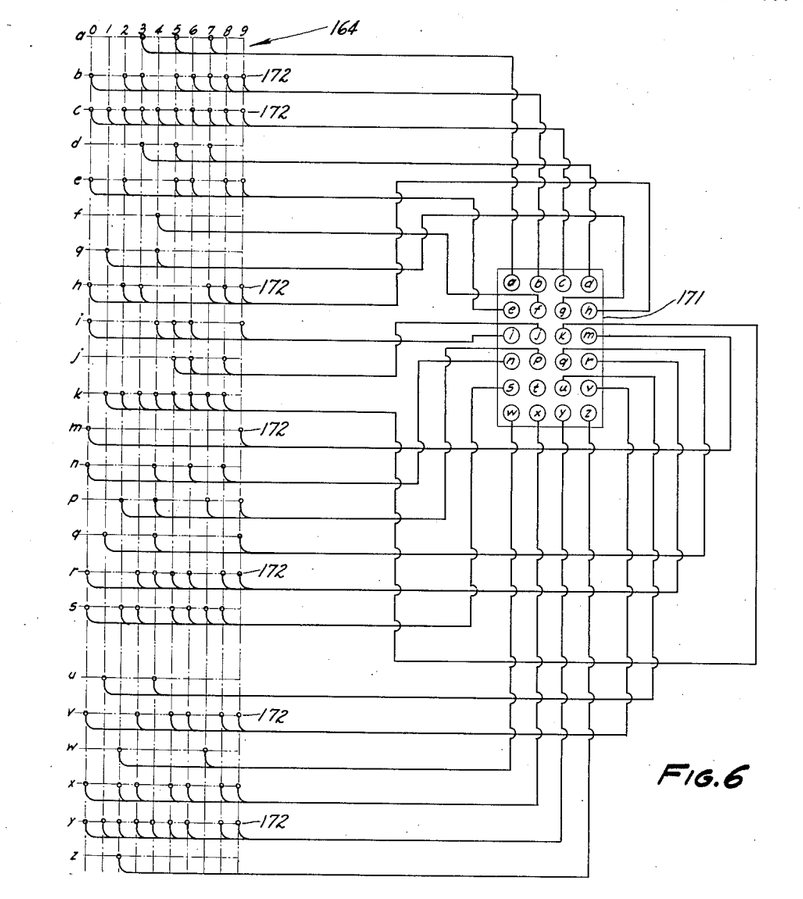
FIGURE 6 is a schematic diagram illustrating the relation of the target contact mechanism of the recording cathode ray tube with one of the elementary electrodes or recording heads of the recording mechanism.

Referring in detail to FIGURE 6 there is illustrated schematically a suitable rectangular arrangement of contacts 172 including a first vertical row marked "0," and nine other vertical rows marked "1" to "9," respectively. Each of the cathode ray tubes 100, 200, 300 and 400 is provided with a target such as 164 supporting contacts 172. For convenience the horizontal rows of contacts of the target 164 are labeled a to z, respectively, and all of the contacts in each of these rows are connected together to a bus bar which in turn is connected to a corresponding designated contact in the block 171. The ordinal elementary electrode block 171 may be designated as an ordinal electrical printing block since it is in engagement with the electro-sensitive paper 154 and electrically prints or records on this paper. For this purpose a block 171 is connected to the target contacts 172 of each of the targets 164 of the cathode ray tubes 100, 200, 300 and 400 and all of the blocks, such as 171, connected to all of these cathode ray tubes are positioned in corresponding order side by side in the electrode head 150 (FIGURE 1). Thus, this electrode head 150 is provided with a block 171 for each of the cathode ray tubes 100, 200, 300 and 400 positioned in this electrode head in the same order as the order in which the cathode ray tubes are enumerated above. One of these electrode blocks 171 is illustrated in elevation in FIGURE 6 with the letters a through z thereon corresponding to the letters a through z in the rectangular contact arrangement 172.

The elementary electrode block 171 comprises a panel of insulating material having the wires a through z embedded therein with one end of each wire extending through the panel to the recording face of the block 171. The exposed ends of the wires a through z project slightly from the face plane of the panel and these ends are carried by the electrode head 150 in contact with the top surface of the electro-sensitive paper 154 so that when the opposing planar electrode 151 is brought up to the under surface of the paper 154 beneath the electrode head 150, comprising a series of the elementary electrode blocks 171, the sensitized paper 154 will be contacted by each of the sets of contact wires a through z, in each of the blocks 171 and by the planar surface of the opposed electrode 151.

However, only the wires of each of the elementary electrode blocks 171 that are electrically energized produce discoloration of the electro-sensitive paper 154, and the wires in each of these blocks 171 that are energized are controlled by the energization of the horizontal deflector plates, that is, deflector plates 167–168 (FIGURE 4) of each of the cathode ray tubes 100, 200, 300 and 400 shown in FIGURE 1. The horizontal beam deflector plates of tubes 100, 200, 300 and 400 are energized either in accordance with the energization of the deflector plates of selection tubes 10, 110, 210, and 310, respectively, or in accordance with the energization of register tubes 601, 701, 801 and 901, respectively, depending upon whether gang switches 182 or 181 are closed as shown in detail in FIGURE 1a wherein the detailed connections for the tubes 10, 100 and 601 as well as the coupling circuits therebetween are illustrated.

Figure 7:
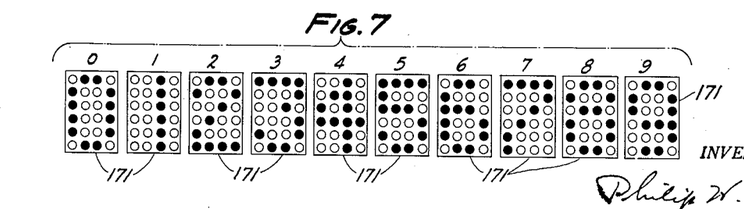
FIGURE 7 is a view illustrating the manner in which the various digits may be represented by a recording head.

Referring to FIGURE 7 there is illustrated a suitable arrangement of 24 contacts or matrix means in each elementary electrode block 171 which can be energized or rendered conducting selectively to form the digits "0" to "9," inclusive, respectively. Thus, for example, if with sensitized paper engaged between the head 150 and the electrode 151 one of the electrode blocks 171 has current passing through the wires, b, c, e, h, i, m, n, r, s, v, x and y the numeral "0" is produced on the paper 154. Correspondingly tracing down the vertical rows of the contact diagram in FIGURE 6, it will be seen that the other numerals may be reproduced as shown in FIGURE 7 when current is passed through the various contacts in each vertical row to the associated ordinal printing electrode block 171.

Each of the elementary ordinal electrode blocks 171 is connected by a cable of wires corresponding to the wiring shown in FIGURE 6 to the associated one of the cathode ray tubes 100, 200, 300, etc. and in turn the cathode of each of these cathode ray tubes are connected through the battery 173 and a switch 174 to the insulated electrode 151. Thus when the electron beam of a cathode ray tube impinges upon any set of the contacts, a circuit is completed including the sensitized paper 154, or the portion thereof between the selected electrodes in each block 171 and the electrode 151, and discoloration of the paper 154 to record the desired indicia is obtained.

Figure 5:
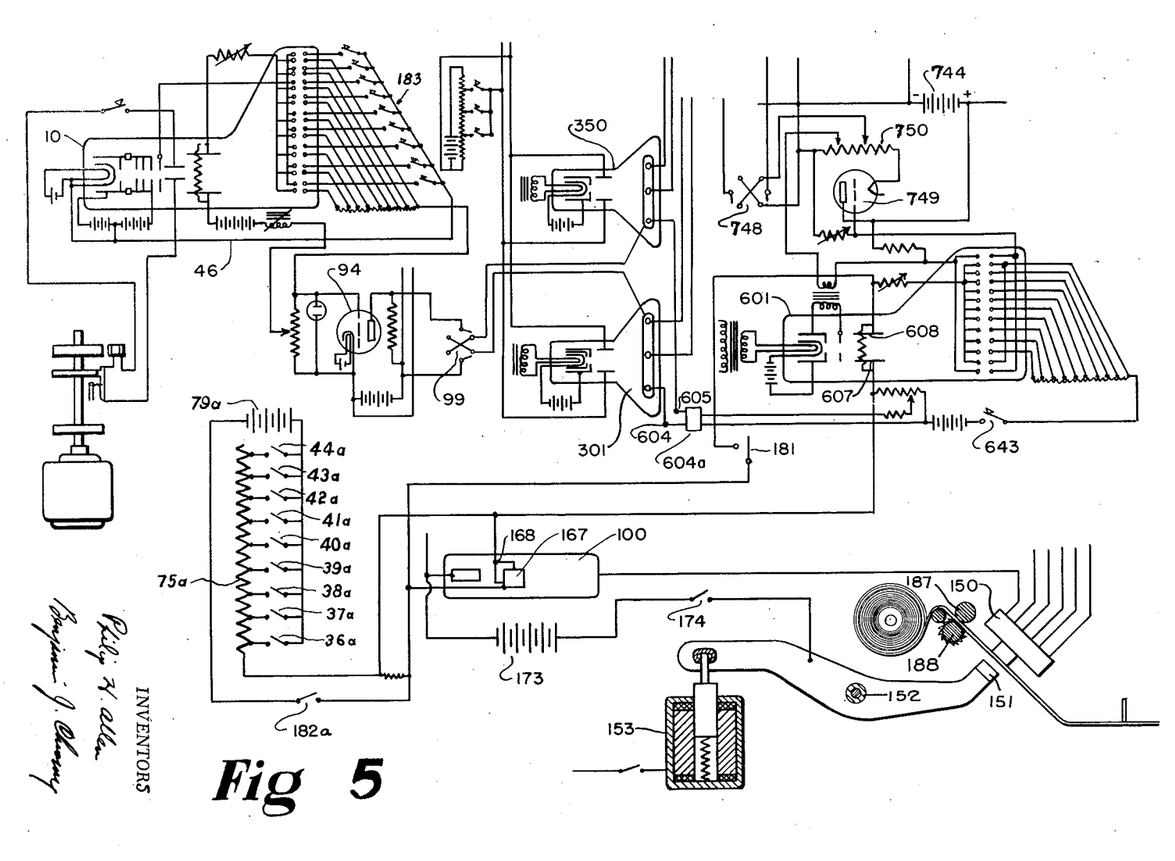
FIGURE 5 is a detail view of a portion of the circuit associated with the recording control and value selecting cathode ray tubes.

Referring to FIGURE 1a it will be noted that the horizontal deflector plates 167 and 168 of the tube 100 (FIGURE 4) are connected through a circuit including a switch 181 with the vertical deflector plates 607 and 608, respectively, of the corresponding lowest order registering tube 601. Similarly the recording tubes 200 to 400 are associated respectively with the registering tubes 701 to 901, respectively. Thus, at any time the gang switches 181 are closed, the electrical potentials or signals at the respective registering tubes will be transmitted to the respectively associated recording tubes. Also these horizontal deflector plates 167 and 168 are connected through a circuit including a switch 182 to the keyboard control means 183 of the first order selecting tube 10 so that potential or signal determined by the key switches 36 to 44 are transmitted to the recording tube 100 when the switch 182 is closed. The recording tubes 200, 300 and 400 are similarly connected to the selecting tubes 110, 210 and 310, respectively. If desired, a series of auxiliary key switches 36a to 44a may be provided to be closed by the value keys of the order in parallel to the switches 36 to 44 inclusive of FIGURE 2. These auxiliary key switches are illustrated at 36a through 44a in FIGURE 5, together with the voltage divider 75a and the battery 79a connected to the deflector plates 167 and 168 of recording tube 100.

Thus, at the time the switch 182a, which corresponds to the gang switches 182, is closed the value standing in the voltage divider 75a to which are connected the auxiliary key switches 36a to 44a, will be recorded through the operation of the recording tube 100 and the electroresponsive recording apparatus controlled thereby.

From the foregoing description it will be seen that with the gang switches 181 closed and the gang switches 182 open the electron beams of the cathode ray tubes 100, 200, etc. will be adjusted horizontally in these tubes in the same manner as electron beams of the register tubes 601, 701, etc. are adjusted vertically, i.e., in accordance with the values standing in the respective register tubes. In this way an electron beam of a recording tube which normally is in alignment with the left-hand row of "zero" contacts shown in FIGURE 6 will be moved horizontally by the potential applied to the deflector plates 167—168 to the row of contacts of the target 164 corresponding to the value standing in the related ordinal register tube. If with this adjustment, the aligned row of contacts of the target 164 is being impinged by the electron beam circuits will be completed through the desired contacts to record an indicia on the paper 154 corresponding to the number standing in the associated ordinal registering tube.

Correspondingly if the gang switches 181 are open and the gang switches 182 are closed, the horizontal deflector plates 167 and 168 of the respective recording tubes are connected to the respective selecting circuits of the selecting tubes 10, 110, 210, etc., in other words will have a potential applied thereto corresponding to the values set into these selecting tubes. Thus, the electron beams of the respective recording tubes will be adjusted horizontally in accordance with the values set into the various orders of the selecting mechanism and printing of these values can be obtained in the same manner.

Thus, if it is desired to perform a recording operation of the values standing in the registering tubes, the gang switches 181 are closed to connect the horizontal deflector plates of the recording tubes 100, 200, 300 and 400 to the deflector plates of the register tubes 601, 701, 801 and 901, respectively. This places potentials on the horizontal deflector plates of the tubes 100, 200, 300 and 400 corresponding to those of the register tubes 601, 701, 801 and 901, respectively, and causes the beams of the former or recording tubes to be deflected to positions on their respective targets corresponding to the numbers set into the respective register tubes. The switch 174 is closed to apply the potential of the battery 173 to the beams of the recording tubes 100, 200, 300 and 400 and to the recording or printing head. The recording solenoid 153 is energized by the closing of the switch 186 and as a result the bottom electrode 151 is brought upward under the recording paper in alignment with the head 150 so that the paper 154 is clamped therebetween, to receive the impression of the indicia desired to be recorded. The switch 186 may be operated manually from any conventional form of printing control key, or by suitable automatic means, if desired.

At the conclusion of the recording operation the line spacing of the paper is performed by means of conventional mechanism associated with a feed roller 187 including a ratchet 188 so that a fresh line or portion of the sensitized paper 154 is available for the next printing operation. If desired, an additional operation key or grand total key may be employed to operate as described above, and, in addition, to effect operation of the resetting circuit for the registering tubes.

Correspondingly if it is desired to perform item printing, the item print key is depressed to close the switches 182, switches 181 being open, and to condition the switches 174 and 186 for closing during each adding or subtracting operation under control of conventional add and subtract keys. Preferably, the above switches are closed under control of a single operating key (not shown). As a result, with the various electron beams of the recording tubes adjusted horizontally of the tubes corresponding to the values in the associated registering tubes, the various electron beams will cause current to flow through the associate wire contacts or electrodes *a* through *z* respectively and form the appropriate indicia on the paper 154.

Figure 8:
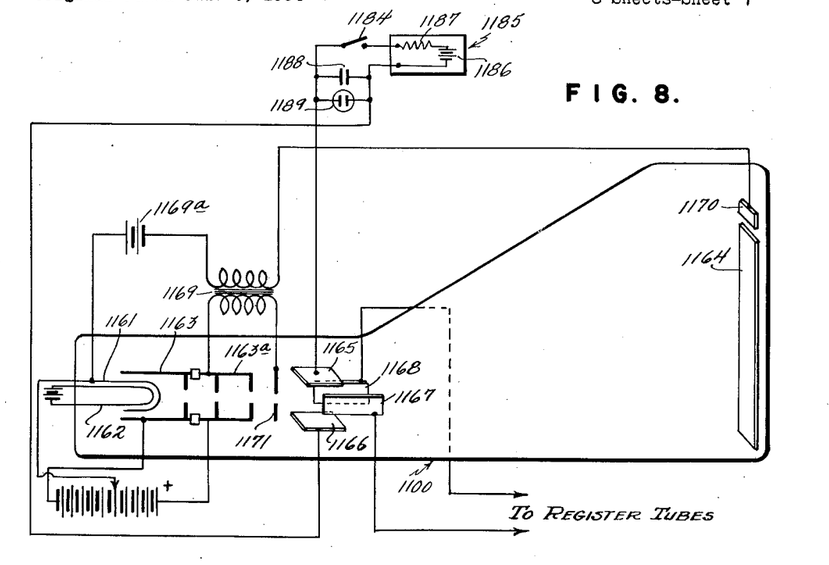
FIGURE 8 is a view of a modified recording cathode ray tube.

*Modified Recording Tube of FIGURE 8*

A modified form of the recording cathode ray or electron beam tube 1100 that may be used in place of each of the tubes 100, 200, 300 and 400 of FIGURE 1, is shown in FIGURE 8 and this modified tube is in general similar to the tube 100 shown in FIGURE 4 in that it is also provided with an electron gun including a cathode 1161, a cathode heating element 1162, a control electrode 1163, one or more focusing anodes 1163a, a pair of horizontal deflectors 1167—1168 and a contact target 1164. However this tube differs from the tube shown in FIGURE 4 in that it employs a narrow pencil-like electron beam instead of a sheet-like beam and as a result a pair of vertical deflectors 1165—1166 connected to a source of deflecting potential 1185 by the switch 1184 must be employed to scan the electron beam over the selected row of contacts of the target 1164 from the bottom of the target 1164 upward during the recording or printing operation whereby the desired indicia is recorded or printed electrically on electro-sensitive paper. After the electron beam is swept or scanned over the selected row of contacts of the target 1164 the beam contacts the quenching-target electrode 1170 and closes the circuit of the primary of the transformer 1169 thereby sending a pulse through this primary and inducing an E.M.F. into the secondary; the latter E.M.F. is applied between the anode 1163a and the quenching electrode 1171 for defocusing or quenching the electron beam. The action of the defocusing or quenching electrode 1171 is such as to blank or cut off the electron beam momentarily after the beam is scanned over the target contacts in a desired operation and when the beam is restored after the momentary blanking thereof it is in position at the bottom of the target 1164.

The horizontal positions of the beams of the various cathode ray tubes 100, 200, 300 and 400 each of which may be of the type shown in FIGURE 8, are controlled by the horizontal beam deflector plates corresponding to plates 1167—1168 as previously described and these beams when only under the influence of deflecting potentials applied to these horizontal deflector plates, impinge upon the bottom portion of the target 1164 of each of the tubes. For example if it is assumed that potentials of magnitudes such that the cathode ray beams of each of these tubes are deflected to the number "7" rows of target contacts of each of the tubes, the beams will impinge on the target 1164 of each tube just below the number "7" target contact rows.

The vertical beam deflecting plates 1165—1166 of each tube control the scanning of the cathode ray beam of each tube vertically over each of the rows of target contacts "0," "1," "2," "3," "4," "5," "6," "7," "8," and "9," so that when the cathode ray beams are each deflected to the number "7" row as explained above the beams will be held below the row of target contacts until the switch 1184 is closed and the vertical deflector plates 1165—1166 are energized to sweep the beams of the cathode ray tubes over the target contacts of the selected row. It will of course be apparent that while in the above explanation all of the beams of the cathode ray tubes were positioned below the number "7" contact rows, the beams of the different tubes may be below different contact rows depending upon the numbers to be printed.

The recording of the desired indicia on the paper 154 does not take place until the vertical beam deflecting circuit of the recording tubes is closed through the switch 1184. Since tubes 100, 200, 300 and 400 are in this modification of this invention of the type corresponding to the tube 1100 the vertical deflectors 1165—1166 thereof are all connected in parallel to the switch 1184 and source 1185 and the beams thereof are all swept across the selected rows of vertical contacts of the targets 1164 corresponding to the numbers desired to be recorded, which of course, correspond to the numbers set into the respective register tubes shown in FIGURE 1. The recording of the indicia on the paper 154 is accomplished by the electric current that flows through the contacts of the targets 1164 of the recording tubes as these contacts are scanned by the respective cathode ray beams. Since the target contacts are connected to the recording contacts in the head 150 electric current flows to these recording contacts through the paper 154 into the member 151 and thereby produce the discoloration in the paper 154, corresponding to the desired indicia.

Thus, when current is passed through selected wires connected to the printing head 150 (FIGURE 1) the portion of the paper engaged between these wires and the opposing electrode 151 will be discolored to make a record. It will be noted that impingement of the beam on any contact in row "a" will energize the corresponding wire "a" of the electrode block 171, and on any contact in row "b" will energize the corresponding wire "b," etc.

Furthermore when the recording or printing tube shown in FIGURE 8 is employed in the circuit arrangement shown in FIGURE 1 in place of each of the tubes 100, 200, 300 and 400 in order to produce a record of the desired indicia on the paper 154, the respective beams of the various tubes are individually deflected to the desired rows of target contacts. The member 151 is brought up into place under the paper 154 and the electric circuit between this member and the source of current supply is closed by a suitable switch as previously explained. The apparatus is now in condition to print or record the desired indicia on the paper 154 and the printing or recording may be accomplished by closing the switch 1184 which applies the potential of the battery 1186 in series with the resistor 1187 across the capacitor 1188 across the vertical deflector plates 1165—1166 of each of the recording or printing tubes 100, 200, 300 and 400 of FIGURE 1. The current from the battery 1186 flows through the resistor 1187 and charges the capacitor 1188 at a rate depending upon the value of the resistor 1187 and at the same time the charge of the capacitor 1188 is applied to the deflectors 1165—1166 for the purpose of sweeping the beams of the respective recording or printing tubes across the desired rows of target contacts while the capacitor 1188 is being charged. When the capacitor 1188 is charged to the ionization potential of glow lamp 1189 the ionized gas in this lamp renders it conductive and the capacitor 1188 is discharged therethrough. At the same time as the glow lamp 1189 is ionized the cathode ray beam impinges upon the target electrode 1170 and a beam quenching potential is applied to the electrode 1171 through the transformer 1169. This prevents the beam from being swept down over the target contacts when the capacitor 1188 is discharged by the glow lamp 1189. However, this beam quenching feature may be eliminated if desired since the sweeping of the target contacts on the downward movement of the beam merely sends another impulse of current through each of the target contacts that were energized when the beam was moved upward during the printing operation.

*Modified Blanking Circuit for the Selection Tubes*

The blanking or quenching circuit consisting of the electrodes 1170 and 1171, transformer 1169 and current source 1169a shown in FIGURE 8 may be conveniently applied to the selection tubes such as the tube shown in FIGURE 2. For this purpose the electrodes 18 to 26 inclusive (FIGURE 2) may be shaped into a strip electrode 1170 (FIGURE 8) which is connected to the transformer 1169 (FIGURE 8) and the secondary of the transformer 1169 may be connected with one terminal thereof to the blanking electrode 16 (FIGURE 2) and the other terminal either to the anode 14 or control electrode 14a or another blanking electrode such as 16 positioned on either side of the first electrode 16 and slightly displaced therefrom (FIGURE 2). It will be understood that while the electrodes 18 to 26 inclusive are combined into a strip electrode that the electrodes 27 to 35 inclusive are selectively connected through keys 36 to 44 to the wire 45, which is connected to the cathode 12. Likewise the battery 1169a (FIGURE 8) is connected with one terminal to the transformer 1169 and the other terminal to the cathode 12 (FIGURE 2).

Figure 9:
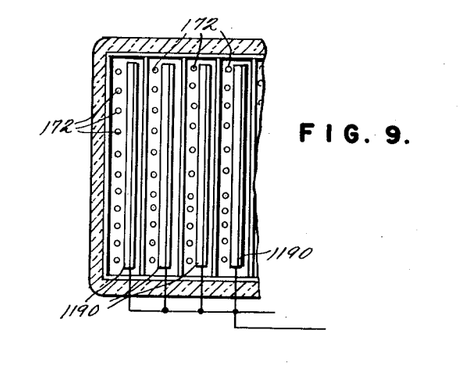
FIGURE 9 is a fragmentary detail view of a modified form of target that may be used in the tubes shown in FIGURE 4 and FIGURE 8.

*Modified Form of Target of FIGURE 9*

In FIGURE 9 is illustrated a modified form of target electrode construction that may be used in the tubes shown in FIGURES 4 and 8. In this target electrode construction narrow nickel or silver strips 1190 coated with secondary electron emitting materials such as caesium activated silver oxide, caesium activated beryllium, beryllium oxide or rubidium activated silver, silver oxide as described on pages 39 and 40 and elsewhere by Zworykin and Morton in the book "Television," published by John Wiley & Sons Inc., New York, 1940, are used. The electron beam of the tube impinges upon the strips 1190 carrying the secondary emitting material and causes emission of secondary electrons which are attracted to the contacts supported by the target since the strips 1190 are connected to the negative terminal of the battery 173 (FIGURE 1) in this modification, instead of the cathodes of the tubes 100, 200, 300 and 400. The recording current in this modification flows from the battery 173 to the strips 1190 (under the stimulating action of the electron beam) to the contacts immediately adjacent to the stimulated secondary electron emitting strip 1190, through the wires to the recording head 150, through the member 151 and switch 174 back to the battery 173. It is of course obvious that in this case the electron beams of the recording tubes impinge upon the desired secondary emitting strip instead of upon the target contacts connected to the desired indicia to be recorded although it is not material if parts of the electron beams impinge upon the contacts also. Suitable baffles are provided between the rows of contacts to capture stray secondary electrons and for this purpose may be made of nickel or like material and given a positive polarity with respect to the strips 1190. However, in any event, the magnitude of this positive polarity would not be great enough to attract the secondary electrons to the baffles in preference to the desired contacts since these baffles are intended to capture only stray electrons.

Figure 10:
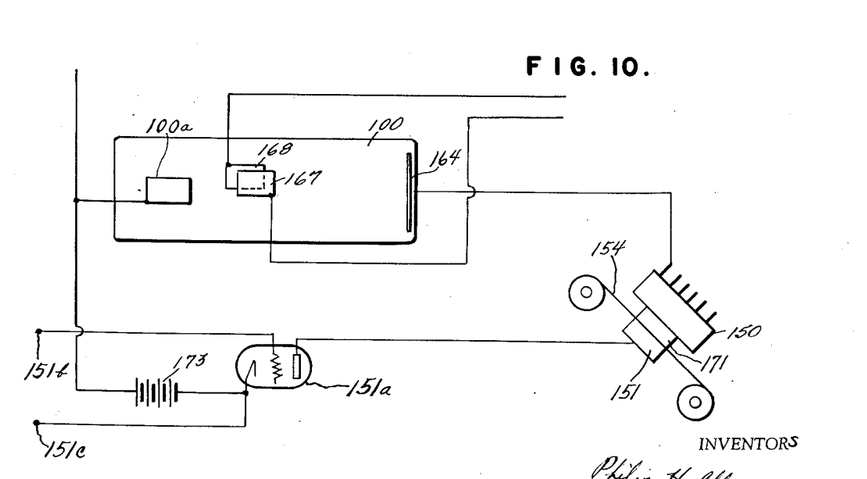
FIGURE 10 is a modified form of recording control employed in accordance with this invention.

In FIGURE 10, there is illustrated a modified form of the recording control apparatus wherein the target 164 of the cathode ray tube 100 is connected to the electrode head 150 that is associated with the electrode block 171 and the recording tape 154 of electrosensitive paper. The electrode 151 is positioned in opposition to the electrode block 171 and is separated therefrom by the tape 154. The block 171 and the electrode 151 are prominently in contact with opposite sides of the tape 154 which is adapted to be passed therebetween. The electrode 151 is connected to the anode of the control tube 151a and the cathode of this tube is connected to the negative terminal of the current supply source 173. The anode of this current supply source 173 is connected to the cathode of the cathode ray tube 100. The deflector electrodes 167 and 168 of the cathode ray tube 100 are connected in the same manner as the deflector electrodes 167 and 168 are connected in FIGURES 1, 1a and 5 since the tube 100 illustrated in these figures corresponds to the tube 100 shown in FIGURE 10.

The control tube 151a is normally substantially nonconducting so that substantially no current passes therethrough between the anode and cathode thereof. However, when it is desired to record a number, indicia or legend on the tape 154, the tube 154a is rendered conductive by applying a signal between the contacts 151b and 151c which modify the grid potential of the tube 151a and permits electric current to flow through this tube from the source of supply 173. This same current flows through the cathode ray tube 100 between the electron gun 100a and the target 164. This current is, therefore, applied between the electrode block 171 and electrode 151 to produce the desired indicia on the tape 154. The recording of the indicia on the tape 154 is substantially instantaneous and, therefore, the tape 154 may be continuously moving between the block 171 and the electrode 151 if desired.

The arrangement of FIGURE 10 may be modified by providing an additional grid in the tube 100 adjacent to the gun 100a to control the beam emitted from this gun and in this modification the tube 151a may be eliminated and the battery 173 connected directly to the plate 151. In this modification this additional grid provided adjacent to the gun 100a may be connected to the terminal 151b and the terminal 151c may be connected to the cathode of the gun 100a.

Figure 11:
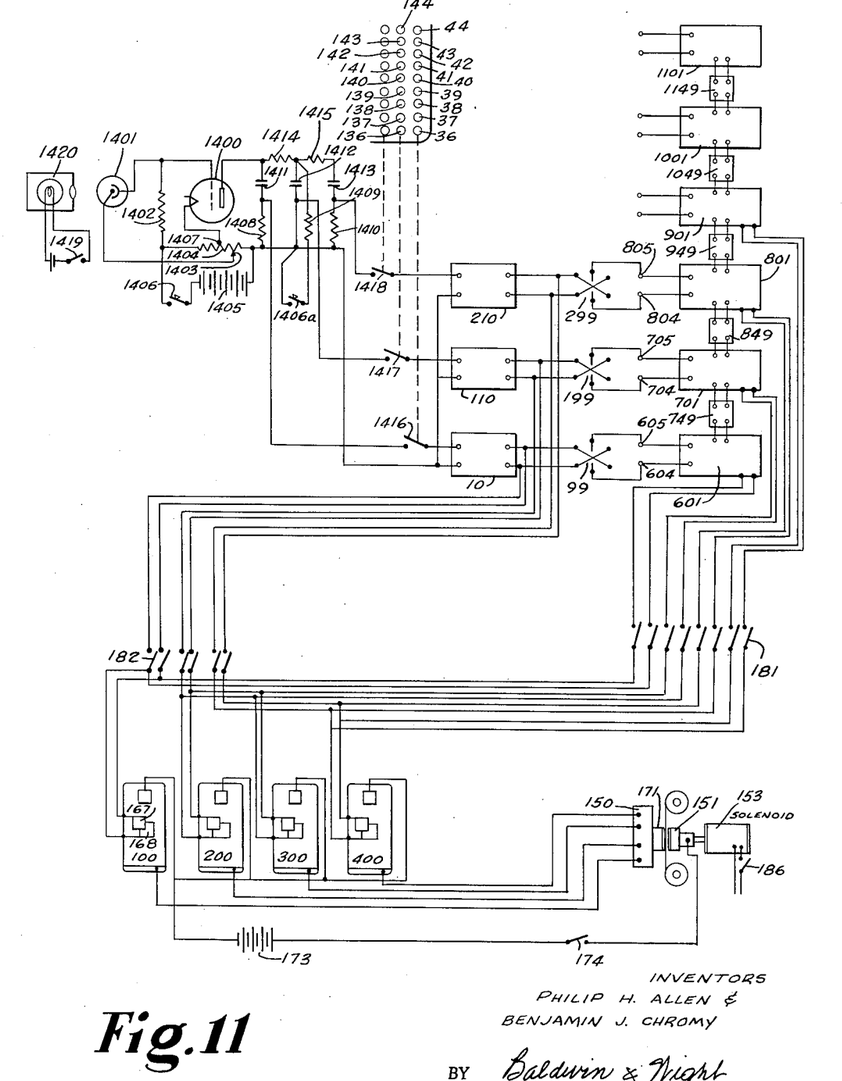
FIGURE 11 is another modified form of the recording control mechanism as employed in this invention.

FIGURE 11 Modification

FIGURE 11 shows a modification of the invention including a modified triggering circuit for the selection tubes and showing the selection tubes coupled directly to the aligned orders of the register tubes, as will be described in greater detail.

This circuit employs an electric discharge tube 1400 of the three-electrode gaseous type having a cathode, a grid and an anode. The grid of the tube 1400 is connected to the cathode of the light sensitive tube 1401 and to the grid resistor 1402. The anode of the light sensitive tube 1401 is connected to the tap 1403 of the voltage divider 1404 which is connected across the battery 1405 through the switch or key 1406. The grid resistor 1402 is, in turn, connected to the negative terminal of the voltage divider 1404 and the cathode of the tube 1400 is connected to an intermediate point 1407 of the voltage divider. The positive terminal of the voltage divider is connected to the common terminal of the resistors 1408, 1409 and 1410, and this common terminal is connected to the deflectors 83, 183 and 283 of the selection tubes 10, 110 and 210, respectively. The upper terminals of the resistors 1408, 1409 and 1410 are connected to condensers 1411, 1412 and 1413, respectively, and the upper terminals of these condensers are connected to the anode of the tube 1400, the condenser 1411 being connected to this anode direct, condenser 1412 being connected thereto through a resistance 1414 and the condenser 1413 being connected thereto through a resistance 1415. A connection between the resistor 1408 and the condenser 1411 is connected to the deflector 84 of selection tube 10 through the switch 1416, the connection between the resistor 1409 and the condenser 1412 is connected to the deflector 184 of selection tube 110 through the switch 1417, and the connection between the resistor 1410 and the condenser 1413 is connected to the deflector 284 of selection tube 210 through the switch 1418. These switches 1416, 1417 and 1418 are mechanically coupled to the keyboard of the calculator so that the circuit between each order of the selection tube is connected or enabled with respect to the aligned order register tube only when a value key of the aligned order is depressed. In other words, when one of the row of keys 36 to 44 of the units order selection mechanism is depressed, the switch 1416 is closed. When one of the keys 136 to 144 of the tens order is depressed, the switch 1417 is closed and correspondingly the switch 1418 is closed only when one of the value keys 236 to 244 is depressed. A suitable form of mechanical coupling is described hereinafter.

As previously explained, the orders of the selection mechanism, including the selection tubes 10, 110 and 210, are connected through the reversing switches 99, 199 and 299, respectively, to the aligned orders of the register tubes indicated schematically at 601, 701 and 801, respectively. Thus, the three lowest orders of the register tubes are adapted to receive digitation pulses from the selection mechanism, and the higher order register tubes 901, 1001 and 1101 do not receive digitation pulses as they are not connected to any orders of the selection mechanism. The tens transfer circuits, including the tubes 749, 849, 949, 1049 and 1149, are similar in all respects to those previously described and are similarly connected between the associated pairs of register tubes 601—701, 701—801, 801—901, 901—1001 and 1001—1101.

Due to the extreme rapidity of operation of this type of electronic selection and registering mechanism, the elapsed time interval of solving a problem in multiplication or division by repeated cycles of operation is extremely short. This time interval may be measured in terms of seconds and can be varied by varying the time constants of certain elements, such as the devices 75a, 175a and 275a, associated with the selection tubes 10, 110, and 210, respectively, and by introducing different values of voltage and resistors associated with the beam deflection circuits of the various tubes 601, 701, 801, 901, 1001 and 1101, as well as controlling the time constants of the delay circuits associated with the triggering tube 1400.

As seen in FIGURE 11, the selection tube or selection circuits and the register tubes of this figure are connected to the recording cathode ray tubes 100, 200 etc. in exactly the same manner as the circuit shown in FIGURE 1.

Operation of the Modified Circuit of FIGURE 11

The circuit shown in FIGURE 11 was designed, among other things, to provide staggered or successive operation of the selection tubes 10, 110 and 210, and after selected values are set into the keyboard and the switches 1416, 1417 and 1418 are closed, the switch 1406 and the switch 1419 are also closed so that lamp 1420 energizes the light sensitive cell 1401 which applies a triggering bias to the gas tube 1400 from the tap 1403 of the voltage divider 1404. In the diagram the tap 1403 is shown connected to the voltage divider 1404 on the positive side of the cathode tap 1407. However, it is obvious that this tap 1403 may be connected on the negative side of the cathode tap 1407 and the position of this grid tap 1403 will be determined by the characteristics of the tube 1400. By energizing the light sensitive cell 1401 from the light source 1420, the gas tube 1400 is fired and rendered conductive and thereupon the condenser 1411 is charged through the tube 1400. Charging the condenser 1411 causes a current impulse to pass through the resistor 1408 and this applies an initiating impulse upon the deflectors 83—84 of the selection tube 10 so that this selection tube is set into operation and caused to generate electrical impulses which are transmitted through the reversing switch 99 to the register tube 601. A short time after the condenser 1411 is charged, and preferably after operation of the tube 601 is completed, charging of the condenser 1412 takes place through the resistors 1409 and 1414. The potential across condenser 1411 is built up by the charge thereof and current then flows through the resistors 1409 and 1414 to charge the condenser 1412. Charging the condenser 1412 applies an initiating pulse on the selection tube 110 through the switch 1417 and starts this tube in operation a short time after the operation of the preceding selection tube 10. Charging the condenser 1412 permits a potential to be applied to the condenser 1413 through the resistors 1410, 1415 and 1414 so that charging current flows through this latter condenser and applies an initiating pulse to the selection tube 210 through the switch 1418. The condensers 1411, 1412 and 1413 may be designed to dissipate their own charges through their dielectrics, or they may be discharged through a suitable resistance which may be shunted across these condensers through one or more switches 1406a which are closed momentarily upon initial movement of the switch 1406 toward closed position, and which are open when switch 1406 is closed.

While we have described this invention in detail in the foregoing specification, it is not desired to limit this invention to the exact details described and illustrated except insofar as those details are defined by the claims.

We claim:

1. In a recording register having plural order electronic selecting and registering mechanisms, both said mechanisms having means for producing a plurality of electrical signals, each of said signals from each of said mechanisms having a different fixed potential, each of said signals corresponding to one of the complete ordinal digit values entered into said mechanisms, an ordinal recording mechanism including means for producing an ordinal array of indicia on a record, and electrical control means for said recording mechanism for selectively connecting said selecting and registering mechanisms to record the values standing therein on the same record to show the result and a factor of a calculation.

2. A recording register as set forth in claim 1 further comprising an electric discharge device for controlling the recording circuit of said electrical control means.

3. In a recording register having electronic selecting and registering mechanisms, both said mechanisms including means for producing fixed electrical potentials, each of said potentials corresponding to one of the complete ordinal digit values entered into said mechanisms, an electrically responsive recording mechanism including means for electrically producing indicia on a record, and electrical control means for said recording mechanism differentially responsive to fixed electrical potentials and connected for selective association with said selecting and registering mechanisms.

4. In a recording register having selecting and registering mechanisms, both said mechanisms including means for producing fixed electrical potentials, each of said fixed potentials corresponding to different values set into each of said mechanisms, a recording mechanism including a movable web and means for producing a record thereon and electrical control means for said record producing means, said control means including an electric discharge device differentially responsive to fixed electrical potentials from said selecting and registering mechanisms, to select the indicia, corresponding to said fixed potentials, for recording on said web.

5. In a recording register, a register including a cathode ray tube having beam responsive means for producing electrical signals corresponding to differential values, said cathode ray tube having means for differential positioning of the beam thereof to produce said signals, recording means responsive to said signal producing means and including a cathode ray tube having beam deflecting means, different positions of the beam of said last mentioned cathode ray tube corresponding to different complex characters, means for instantaneously producing by differential deflection of the beam of said last mentioned cathode ray tube the configuration of a printed complex character corresponding to the value of the signal produced, and means for connecting said beam responsive means of said register in controlling relation to said beam deflecting means of said recording means.

6. In a recording machine, recording means including an element for producing a complex configuration of different printed characters, said element comprising a rectangular array of electrical contacts, said recording means also including an electrode opposed to said element, and control means for said element including a cathode ray tube having an array of target electrodes, different groups of said target electrodes being permanently connected to respective groups of said electrical contacts, and means for causing the beam of the cathode ray tube to impinge on selected ones of said target electrodes to cause said element to instantaneously produce any one of a plurality of different printed characters of complex configuration.

7. In a recording machine, recording means for producing printed characters of complex configuration, said means having a two dimensional array of electrodes for selective energization in groups to produce complex configuration of printed characters and control means for said recording means including a cathode ray tube having an array of target electrodes, different groups of said target electrodes being permanently connected to said two dimensional array of electrodes, and means for causing the beam of the cathode ray tube to impinge on selected ones of said target electrodes to cause said recording means to instantaneously produce any one of a plurality of different complex configurations of printed characters.

8. In a recording register, means for producing different electrical signals corresponding to differential values, recording means responsive to said signal producing means and including a cathode ray tube having a plurality of elongated target areas and having beam forming means to provide a sheet-like beam for cooperating with said elongated target areas, said tube also having beam controlling means responsive to the signals for controlling the target area on which said sheet-like beam is impinged, and means responsive to the positioning of said sheet-like beam in different ones of said target areas of said cathode ray tube for instantaneously producing complete indicia corresponding to the selected signal applied to the beam controlling means of the cathode ray tube.

9. In a recorder, means for producing electrical signals corresponding to complete legible characters representing intelligence, recording mechanism including means for forming electrical representation of characters in response to signals including a printing electrode comprising a rectangular array of electrode elements for selective energization in groups to form the configuration of different complex printed characters, said signal producing means including a two-dimensional target divided into different target segments, each segment including a plurality of target electrodes permanently connected to a selected group of said array of electrode elements, and said signal producing means also including means for producing a beam of radiant energy and directing said beam toward a selected one of said target areas to impinge upon the target electrodes thereon.

10. Apparatus as set forth in claim 9 further characterized in that the said beam of radiant energy impinges simultaneously upon all the target electrodes of a target area.

11. In a recording machine, recording means including an element having a rectangular array of electrodes for producing an electrical representation of various legible characters, and control means for said element including a cathode ray tube having a rectangular array of target electrodes arranged in rows, each row of target electrodes being connected to selected ones of said rectangular array of electrical electrodes to cause energization thereof to represent a legible character, said cathode ray tube also having beam forming means for cooperating with said rows of target electrodes, and control means for said beam to cause impingement of said beam on a selected row of target electrodes for causing said element to produce the legible character corresponding to the selected row of target electrodes.

12. In a recording machine, means for producing electrical potentials corresponding to differential values, recording means responsive to said potential producing means and including a cathode ray tube having a plurality of target areas and having a beam forming means to provide a beam for cooperating with said target areas, said tube also having beam controlling means responsive to the potentials for controlling the target area on which said beam is impinged, and means responsive to the positioning of said beam in different ones of said target areas of said cathode ray tube for producing the indicia corresponding to the selected potential applied to the beam controlling means of the cathode ray tube.

13. A recording machine as set forth in claim 12 further comprising a transformer having a winding connected between one of said target areas and the cathode of said cathode ray tube and having another winding connected to a beam control electrode of said cathode ray tube.

14. A recording machine as set forth in claim 13 further comprising an oscillation generator connected to one set of deflector plates of said cathode ray tube for sweeping the beam of said cathode ray tube over said target areas, said target area connected to said transformer winding being adapted to supply a pulse to said transformer when contacted by said beam to control the intensity of said beam during that portion of the beam sweep.

15. In a recorder, means for producing a plurality of different fixed electrical potentials, each of said potentials corresponding respectively to a complete character representing intelligence, recording mechanism including matrix means for forming a complete representation of any one of a plurality of different characters of complex configurations and means selectively responsive to said fixed potentials impressed thereon for transmitting controlling signals to said representation forming means to select the character to be recorded.

16. In a recording register, means for producing a plurality of different fixed electrical potentials each corresponding to a different complete digit, recording means including means for producing a record on electrosensitive paper responsive to said potential producing means and including a cathode ray tube having beam controlled matrix means for producing a complex configuration corresponding to the different potentials produced, and control means for connecting said potential producing means to the beam controlled matrix means of said tube to select the different complete digits to be recorded.

17. In a recording register, means for producing fixed electrical potentials corresponding to differential values, recording means responsive to said potential producing means and including a cathode ray tube having beam forming means to provide a sheet-like beam and having a target electrode with a plurality of different target areas each of linear form and also having beam controlling means for controlling the one of said target areas on which said sheet-like beam is impinged, and means responsive to the positioning of said sheet-like beam in said different target areas of said cathode ray tube for producing indicia corresponding to the selected potential applied to the beam controlling means of the cathode ray tube.

18. In a recording register comprising a circuit for selectively providing electrical potentials of different fixed magnitudes, said potentials of different magnitudes corresponding to different digits, recording mechanism including matrix means responsive to said electrical potentials for electrically and simultaneously producing complex configurations of said digits on a record, and control means for said configuration producing means responsive to said different potentials for causing said recording producing mechanism to record different digit configurations corresponding to the different potentials.

19. In a recording register having two electronic value storing mechanisms for storing related values of a calculation, both said mechanisms including means for producing fixed electrical potentials corresponding to different values set into each of said mechanisms, a recording mechanism including a movable web and means for producing a record thereon and electrical control means for said record producing means, said control means including an electric discharge device differentially responsive to fixed electrical potentials from said value storing mechanisms, to select the indicia, corresponding to said fixed potentials, for recording on said web the related values of a calculation.

20. In a recording register having two electronic value storing mechanisms for storing related values of a calculation, both said mechanisms including means for producing different electrical signals corresponding to different values entered into said mechanisms, an electrically responsive recording mechanism including means for electrically producing indicia on a record, an electrical control means for said recording mechanism differentially responsive to said different electrical signals and connected for selective association with said value storing mechanisms for recording on said record the related values of a calculation.

21. In a recording register having two electronic value storing mechanisms for storing related values of a calculation, both said mechanisms having means for producing a plurality of different electrical signals, said signals corresponding to different values set into said mechanisms, an ordinal recording mechanism including means for producing an ordinal array of indicia on a record and electrical control means for said recording mechanism for selectively connecting said electronic value storing mechanisms to record the values standing therein on the same record to show the result and a factor of a calculation.

22. Recording apparatus comprising a cathode ray tube having an inner target area, a plurality of electrical contacts disposed on said inner target area and being adapted to be energized in groups each group comprising a plurality of contacts and representing a complex character such as a complete arabic numeral, means including a source of electrons for projecting a beam of electrons toward said target area to selectively impinge different ones of said contact groups, a conductive member disposed externally of and spaced from said tube, a source of direct current potential having one terminal coupled to said source of electrons in the tube and the other terminal connected to said conductive member, an electroresponsive recording member adapted to face said conductive member on one side thereof, and means connected to said contacts and disposed on the other side of said recording member and for applying an electric field from each of said contacts to said recording member to record visually selected complete arabic numerals of complex configuration.

23. An indicia producing apparatus for electronic computer systems in combination, a cathode ray tube having a plurality of beam intercepting targets and beam deflection means, means for supplying signals from two alternative computer signal sources providing related signals in a calculation to provide a plurality of static conditions for directing the cathode ray beam to selected ones of said targets, and means associated with said targets for producing indicia characterized by said signal sources.

24. An electronic system comprising in combination, electronic apparatus for producing electrical signals corresponding to values, a beam generating device, beam deflecting members positioned about the beam, means connected for selectively polarizing selected ones of said members in accordance with said electrical signals from two cooperatively related sources in said electronic apparatus, a plurality of beam targets arranged in a two dimensional array to produce output signals related to indicia corresponding to said values, and means to control which of said source signals are utilized to control said beam to produce said output signals.

25. An information storage system comprising the combination of a first information storage device including a cathode ray tube and a second information storage device including a cathode ray tube, both of said storage devices having means for storing a plural figure number and at least one of said storage devices having electron beam means for producing discrete electrical pulses to reproduce values stored therein, means for placing information into one of said storage devices, a common output device, means for reading said first storage device for desired information and for obtaining an output of such information, means for maintaining said desired information in said first storage device, both during and after operation of said reading means, means for transmitting said output to said common output device, means for obtaining an output of information related to said desired information from said second storage device, and means for entering said related information in said common output device whereby said output device is capable of supplying both said desired information and said related information in related fashion.

26. An information storage system comprising the combination of a first electronic information storage device having items of information stored therein and having means for maintaining said items of information stored during repeated reading thereof, a second electronic information storage device having items of information stored therein related to those items stored in said first storage device, both of said storage devices having means for storing a plural figure number and having means for producing different electrical signals corresponding to values of said numbers, means for placing information into one of said storage devices, means to read said first storage device for information stored therein, electronic means for sensing said second storage device for related information stored therein, and output means for coupling to each of said storage means to produce an output of information from both said devices in related fashion, including means for producing a visible record of such information.

27. An information storage system comprising the combination of a beam responsive information storage device having items of information stored therein, said beam responsive information storage device including a cathode ray tube including means for producing a plurality of different electrical signals representing different items, another information storage device having items of information stored therein related to those stored in said beam responsive storage device, means connected to said beam responsive information storage device for repeatedly transmitting the same items therefrom, means to derive from both said storage devices information stored therein, and means for utilizing the information derived from both said storage devices as an output.

28. An information storage system comprising the combination of a first beam responsive information storage device having items of information stored therein, a second beam responsive information storage device having items of information stored therein related to those stored in said first beam responsive storage device, both said beam responsive information storage devices including a cathode ray tube including means for producing a plurality of different electrical signals representing different items, means connected to said first beam responsive information storage device for repeatedly transmitting the same items to said second information storage device, means to derive by the respective positioning of the beam of its cathode ray tube items from both of said storage devices, and means to resolve the information derived from both said storage devices as an output.

29. An information storage system comprising the combination of a first information storage device having a plurality of independent storage elements and including means for placing information in random manner in said storage elements, and a second information storage device bearing information related to that stored on said first storage device, both of said storage devices having means for storing a plural figure number and also having means for maintaining said items of information during repeated reading of such information to enable repeated use of the items in succeeding different operations, means for placing information into one of said storage devices, means to read the information stored on said first storage device and to modify the information in said second storage device, and output means for said second storage device.

30. An information storage system comprising the combination of a first electronic information storage device and a second electronic information storage device bearing information related to that stored on said first storage device, both of said storage devices having electrical pulse responsive means for storing a plural figure number and also having means for maintaining said items of information during repeated reading of such information, means for placing information into one of said storage devices, means for selectively reading the information stored on said storage devices, and electrical output means for said storage devices for instantaneously printing the information as complex characters.

31. An information storage system comprising the combination of a first beam responsive information storage device and a second beam responsive information storage device bearing information related to that stored in said first storage device, means for placing information into one of said storage devices including means for producing discrete electrical pulses, means to initiate reading of the information stored on said first storage device and to selectively transmit said read information for use in connection with the information in said second storage device, and output means for said first and said second storage devices for utilizing information from said storage devices in related fashion, said first storage device being constructed to maintain the information stored therein during successive readings.

32. In a recording and memory storage system having means for storing items of information as numbers and including an electrically responsive information storage device having a plurality of adjacent storage means for storing related information and having means providing access to any selected storage means in random fashion, electrically operative means for entering information affecting the information in said storage device, selectively operable means operable in random fashion for selecting any one of said plurality of storage means for entry of information from said entering means into said storage device to modify the information in said storage device, means controlled by said storage device for producing different electrical signals representing different numbers, and recording means responsive to said electrical signs for receiving information from said storage device.

33. In a recording and memory storage system having means for storing items of information as numbers and including an information storage device having a plurality of electrically responsive arrays of storage elements for storing related information and having means providing access to any selected storage elements in random fashion, electrically operative means for entering a change in the information in said storage device, selectively operable means for selecting in random fashion any one of said plurality of arrays for entry of a change from said entering means into said storage device, electrically responsive means for obtaining information successively from the arrays of said storage elements as different electrical signals, and means controlled by said obtaining means for recording information from said storage device.

34. An information storage system comprising the combination of a first electronic information storage device and a second electronic information storage device, electrical means for placing information into one of said storage deivces, means to initiate reading of said first storage device at a desired time subsequent to the time of placing the information therein, electrical output means for said storage devices, means to read said first storage device for desired information and for obtaining an output of such informaiton while maintaining the information stored therein, means for transmission of said desired information to said output means, means for obtaining an output of information related to said desired information from said second storage device, and means for entering said related information in said common output device whereby said output device is capable of supplying both said desired information and said related information in related fashion.

35. An information storage system comprising the combination of a first information storage device having a plurality of information storage arrays and having means providing access to any selected storage array in random fashion, means for automatically causing scanning of said arrays to derive information therefrom, a second information storage device having items of information stored therein related to those stored in said first storage device, both of said storage devices having means for storing a plural figure number, randomly operated means for placing items of information into one of said storage devices, means to derive information stored in said second information storage device, and means to supply the information derived from both said storage devices as a visible output.

36. An information storage system comprising the combination of beam responsive information storage means having a plurality of information storage arrays, means for automatically causing beam scanning of said arrays to derive information therefrom, said beam responsive information storage means including cathode ray tube means, a second information storage device having items of information stored therein related to those stored in said first mentioned beam responsive storage means, means to derive from both said storage means information stored therein, and means for utilizing the information derived from both said storage means as an output.

37. An information storage system comprising the combination of beam responsive information storage means having a plurality of information storage arrays, means for automatically causing beam scanning of said arrays to derive information therefrom in the form of different electrical signals, said beam responsive information storage means including cathode ray tube means, a second information storage means having items of information stored therein related to those stored in said first-mentioned beam responsive storage means, means connected to said beam responsive information storage means for repeatedly transmitting the same items therefrom, means to derive from both said storage means information stored therein as different electrical signals, and means for utilizing the information derived from both said storage means as an output.

38. An information storage system comprising the combination of a first information storage device having a plurality of information storage arrays and having means providing access thereto in random fashion, means for automatically causing scanning of said arrays successively to derive information therefrom, said last mentioned means including means for determining the sequence of scanning of said arrays, a second information storage device having items of information stored therein related to those stored in said first storage device, means for placing items of information into one of said storage devices, means to derive information stored in said second information storage device in the form of different electrical signals, and means to supply the information derived from both said storage devices as a visible output.

39. An information storage system comprising the combination of an information storage device having items of information stored thereon in parallel fashion or array, the items being numbers in sequence on each array, each array bearing different numerically larger identification than a preceding array, means including a beam to scan a first array, means responsive to one selected condition of said first array to cause scanning of a succeeding array without scanning of said first array, means responsive to another selected condition of said first array to cause said beam to move along said first array, and means for providing an output of the information read including recording means for said information.

40. In a memory storage system of the type wherein items of information are stored as numbers and including means to store said numbers in a plurality of adjacent storage means, each storage means bearing different identifications than a preceding adjacent storage means, means for searching said storage system selectively from storage means to storage means, means responsive to a selected storage condition of a first storage means to select for reading a succeeding storage means without reading of said first storage means, means responsive to another storage condition of said first storage means to cause reading of said first storage means, and means for providing an output of the information read from said storage means including recording means for said information.

41. In an information storage read-out device, a target having a plurality of separate areas, each of said target areas being a linear array of target elements in an individual predetermined pattern corresponding to particular information to be read out, beam forming means to provide a beam for selecting different target areas for the reading out of said information, deflector electrode means for directing said beam to a selected target area and for scanning said beam over said selected target area, each of said target areas having a different pattern whereby a different particular output signal pattern is derived as a result of the scanning of the different target areas, means for producing predetermined electrical potentials for energizing said deflector electrode means, and means for receiving a signal related to at least one of said predetermined electrical potentials as a result of said scanning.

References Cited in the file of this patent

UNITED STATES PATENTS

| | | |
|---|---|---|
| 2,248,522 | Conrad | July 8, 1941 |
| 2,302,009 | Dickinson | Nov. 12, 1942 |
| 2,320,337 | Bryce | June 1, 1943 |
| 2,334,534 | Ballweg | Nov. 16, 1943 |
| 2,366,913 | LeClair | Jan. 9, 1945 |
| 2,501,791 | Silverman | Mar. 28, 1950 |
| 2,517,712 | Riggen | Aug. 8, 1950 |

UNITED STATES PATENT OFFICE

CERTIFICATE OF CORRECTION

Patent No. 3,038,158 June 5, 1962

Philip H. Allen et al.

It is hereby certified that error appears in the above numbered patent requiring correction and that the said Letters Patent should read as corrected below.

Column 16, line 23, strike out "and"; line 28, after "systems" insert -- comprising --; column 18, line 50, for "deivces" read -- devices --; column 19, line 10, for "device" read -- means --.

Signed and sealed this 2nd day of Ocotber 1962.

(SEAL)
Attest:

ERNEST W. SWIDER
Attesting Officer

DAVID L. LADD
Commissioner of Patents